US011025007B2

(12) United States Patent
Sakaue

(10) Patent No.: US 11,025,007 B2
(45) Date of Patent: Jun. 1, 2021

(54) ELECTRONIC COMPONENT

(71) Applicant: IRISO ELECTRONICS CO., LTD., Kanagawa (JP)

(72) Inventor: Junya Sakaue, Kanagawa (JP)

(73) Assignee: IRISO ELECTRONICS CO., LTD., Kanagawa (JP)

( * ) Notice: Subject to any disclaimer, the term of this patent is extended or adjusted under 35 U.S.C. 154(b) by 0 days.

(21) Appl. No.: 16/628,151

(22) PCT Filed: Jun. 26, 2018

(86) PCT No.: PCT/JP2018/024090
§ 371 (c)(1),
(2) Date: Jan. 2, 2020

(87) PCT Pub. No.: WO2019/021717
PCT Pub. Date: Jan. 31, 2019

(65) Prior Publication Data
US 2020/0136313 A1 Apr. 30, 2020

(30) Foreign Application Priority Data

Jul. 28, 2017 (JP) .............................. JP2017-146709

(51) Int. Cl.
*H01R 13/631* (2006.01)
*G03B 17/02* (2021.01)
*H01R 13/405* (2006.01)

(52) U.S. Cl.
CPC ......... *H01R 13/6315* (2013.01); *G03B 17/02* (2013.01); *H01R 13/405* (2013.01)

(58) Field of Classification Search
CPC .......................... H01R 13/405; H01R 13/6513
(Continued)

(56) References Cited

U.S. PATENT DOCUMENTS 4,418,977 A * 12/1983 O'Shea, Jr. .......... H01R 12/675
439/405
4,775,333 A * 10/1988 Grider .................. H01R 12/721
264/277
(Continued)

FOREIGN PATENT DOCUMENTS

JP 6-223903 8/1994
JP 8-045627 A 2/1996
(Continued)

OTHER PUBLICATIONS

International Search Report for PCT Patent App. No. PCT/JP2018/024909 (dated Sep. 18, 2018).
(Continued)

*Primary Examiner* — Neil Abrams
(74) *Attorney, Agent, or Firm* — Cermak Nakajima & McGowan LLP; Tomoko Nakajima

(57) ABSTRACT

The size of an electronic component is made reducible so as to match a downsized connection object. The electronic component includes a first pin terminals, a second pin terminals, and an external connection case having a retention wall for retaining the first pin terminals and the second pin terminals. The first pin terminals and the second pin terminals have connector-connection portions and external connection portions, respectively. Clearances between adjacent connector-connection portions are made larger than corresponding clearances between adjacent external connection portions.

8 Claims, 7 Drawing Sheets

(58) Field of Classification Search
USPC .......................... 655/655, 736; 247/247, 248
See application file for complete search history.

(56) References Cited

U.S. PATENT DOCUMENTS

| | | | | |
|---|---|---|---|---|
| 4,952,529 | A * | 8/1990 | Grider ................... | H05K 3/3405 |
| | | | | 29/836 |
| 5,344,335 | A | 9/1994 | Scholz et al. | |
| 5,599,595 | A * | 2/1997 | McGinley ............ | H01R 13/035 |
| | | | | 428/33 |
| 5,674,083 | A * | 10/1997 | Whiteman, Jr. ... | H01R 13/6485 |
| | | | | 439/181 |
| 5,755,584 | A * | 5/1998 | Kodama ............ | H01R 13/6315 |
| | | | | 439/248 |
| 5,959,521 | A * | 9/1999 | Kohmura ................ | H01F 27/40 |
| | | | | 336/198 |
| 6,116,931 | A * | 9/2000 | McCleerey .............. | H01R 4/06 |
| | | | | 439/173 |
| 6,159,053 | A * | 12/2000 | Tung ....................... | H01R 31/06 |
| | | | | 439/636 |
| 6,309,225 | B2 * | 10/2001 | Kameyama ............ | H01R 31/06 |
| | | | | 439/692 |
| 7,008,241 | B2 * | 3/2006 | Marceau .............. | H01R 13/405 |
| | | | | 439/83 |
| 7,048,569 | B2 * | 5/2006 | Shimizu ............. | H01R 13/6272 |
| | | | | 439/354 |
| 7,727,028 | B1 | 6/2010 | Zhang et al. | |
| 7,922,526 | B2 * | 4/2011 | Okada .................. | H04N 5/2252 |
| | | | | 439/544 |
| 8,337,227 | B2 * | 12/2012 | Arai .................... | H01R 13/5219 |
| | | | | 439/271 |
| 8,422,247 | B2 * | 4/2013 | Kameyama .......... | H01R 13/506 |
| | | | | 361/799 |
| 9,147,952 | B2 * | 9/2015 | Kikuchi ................ | H01R 13/625 |
| 9,331,405 | B2 * | 5/2016 | Tsang ................. | H01R 13/6215 |
| 10,381,773 | B2 * | 8/2019 | Hashimoto ........ | H01R 13/5216 |
| 2004/0235317 | A1 * | 11/2004 | Schiefer ............... | H05K 9/0037 |
| | | | | 439/76.2 |
| 2006/0276061 | A1 | 12/2006 | Koguchi et al. | |
| 2016/0190722 | A1 * | 6/2016 | Nagasawa ............ | H01R 13/50 |
| | | | | 439/660 |
| 2017/0170588 | A1 * | 6/2017 | Doi ...................... | H01R 13/502 |
| 2020/0045213 | A1 * | 2/2020 | Sakamoto ........... | H04N 5/2252 |
| 2020/0136313 | A1 * | 4/2020 | Sakaue ................. | G03B 17/02 |

FOREIGN PATENT DOCUMENTS

| | | |
|---|---|---|
| JP | 2001-176617 | 6/2001 |
| JP | 2001-244012 A | 9/2001 |
| JP | 2004-273391 A | 9/2004 |
| JP | 2007-001334 A | 1/2007 |
| JP | 2007-018785 A | 1/2007 |

OTHER PUBLICATIONS

Extended European Search Report for European Patent App. No. 18839227.8 (dated Mar. 29, 2021).

* cited by examiner

Fig.4A
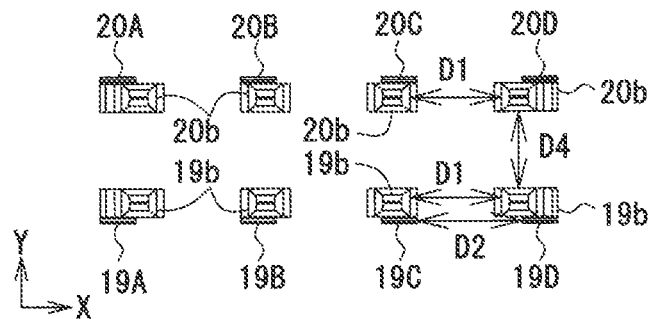
Fig.4B
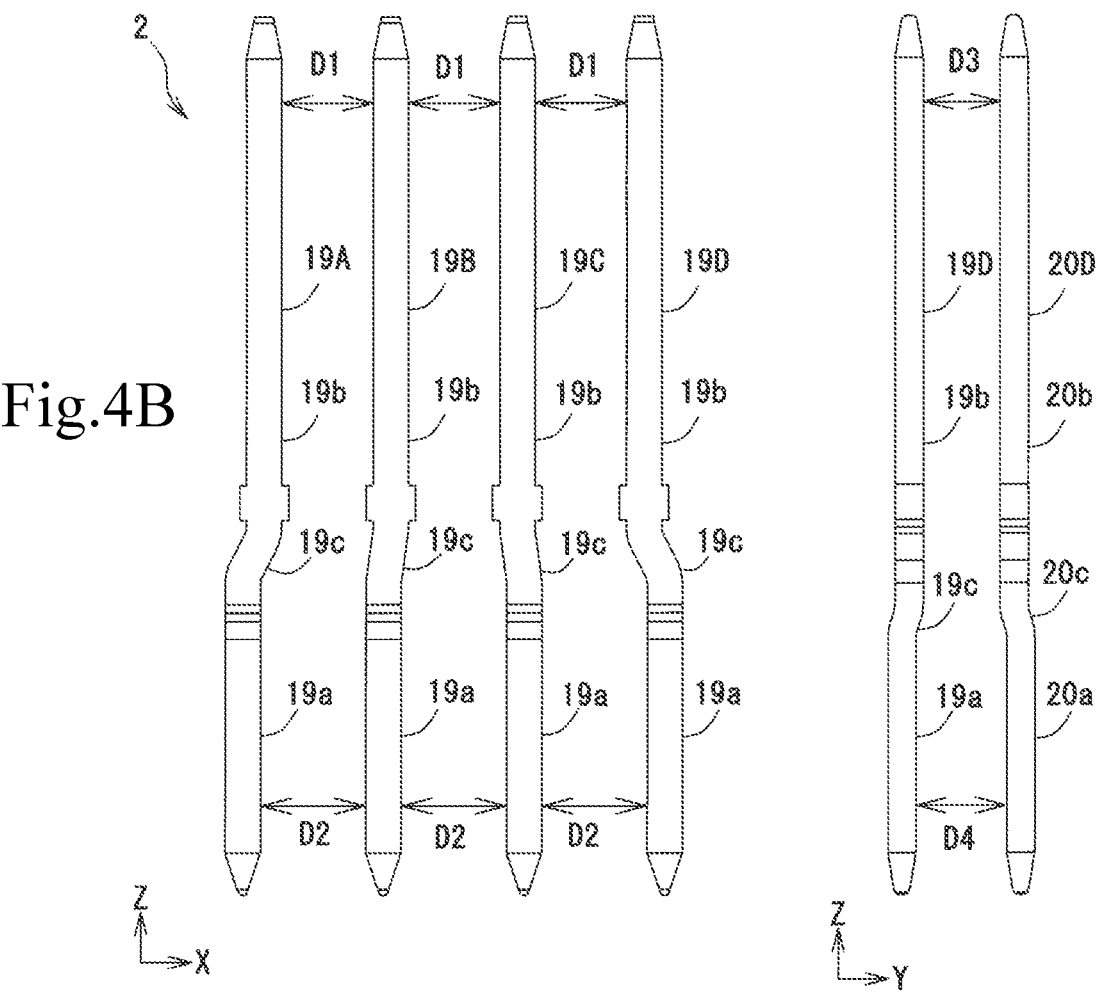
Fig.4C
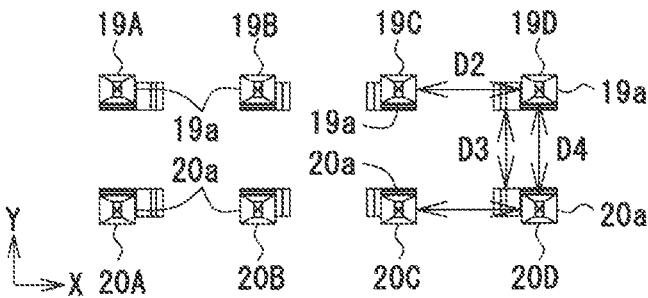
Fig.4D

ELECTRONIC COMPONENT

This application is a national phase entry under 35 U.S.C. § 371 of PCT Patent Application No. PCT/JP2018/024090, filed on Jun. 26, 2018, which claims priority under 35 U.S.C. § 119 to Japanese Patent Application No. 2017-146709, filed Jul. 28, 2017, both of which are incorporated by reference.

TECHNICAL FIELD

The present invention relates to an electronic component to be connected to a connector and an electronic component equipped with the connector.

BACKGROUND ART

An example of a known connection structure for connecting a connector and an electronic component embedded in an electric device to each other is a connection structure for a vehicle-mounted camera disclosed in PTL 1. In this known art, multiple connector terminals (11b) shaped as straight pins are disposed so as to pierce a partition wall (rear wall B) of a case (rear-side case 9) that constitutes an electronic component. One ends of the connector terminals are inserted into, and electrically connected to, a substrate connector mounted on a substrate having an image sensor (3a), and the other ends of the connector terminals are electrically connected to a harness connector (counterpart connector 100) disposed at a terminal end of a harness (connection object) for outputting signals from the image sensor (3a) to an external device.

CITATION LIST

Patent Literature

PTL 1: Japanese Unexamined Patent Application Publication No. 2007-001334, FIG. 1, FIG. 2
PTL 2: Japanese Unexamined Patent Application Publication No. 2007-018785, FIG. 1, FIG. 3

SUMMARY OF INVENTION

Technical Problem

Vehicle-mounted electric devices are desired to be made small, and the vehicle-mounted camera and the harness described above are not exceptions. However, as the size of the harness and accordingly the size of the harness connector become small, the spacing between adjacent connector terminals (11b) to be connected to the harness connector needs to be made small. In this case, however, the spacing of one ends of the connector terminals (11b) becomes incompatible with the spacing of connection chambers of the substrate connector, and consequently, the connector terminals (11b) come into contact with a housing of the substrate connector, which prevents the connector terminals (11b) from entering the connection chambers.

One solution to this problem is to reduce the size of the substrate connector so as to match the spacing of one ends of the connector terminals (11b). However, in the case in which the substrate connector is a movable connector (see PTL 2 for an example of the case), the size of the substrate connector cannot be readily reduced for the following reason. The movable connector includes a stationary housing mounted on a substrate, a movable housing being displaceable with respect to the stationary housing in three-dimensional directions, in other words, in the X, Y, Z directions, and a terminal having, for example, an inverted U-shape movable spring that displaceably supports the movable housing. An advantage of the movable connector is that when the movable connector engages a connection object, the movable connector can absorb positional deviation during insertion of the connection object due to the movable spring displacing the movable housing. In addition, due to the displacement of the movable spring, the movable connector can absorb vibrations and impacts occurring during the use of the electric device. If the size of the substrate connector, which is formed as the movable connector, is reduced so as to match the narrow spacing of the connector terminals (lib), the spacing between adjacent connection chambers is caused to be narrow. This results in size reduction, in the X and Y directions, of guide surfaces of each connection chamber. The guide surfaces are formed as a conical shape for guiding insertion of the connector terminal (lib) into the connection chamber. Consequently, a guiding allowance of the guide surfaces to be able to guide the connector terminal (lib) becomes small. This results in a reduction in the allowance for positional deviation of the connector terminal during insertion with respect to the insertion axis of the connection chamber.

Especially in the case of the movable connector, the amount of the guiding allowance of the guide surfaces leads to the amount of displacement of the movable spring in the X and Y directions. Accordingly, in this case, the movable connector cannot take full advantage of the movable spring capable of being displaced in the X and Y directions. In addition, the amount to which the movable spring can absorb accumulated allowable errors occurring during assembly of the electric device is limited to be small.

The present invention is made with the above known art as background. An object of the present invention is to keep the guiding allowance of the guide surfaces with respect to the connection object as large as possible while reducing the size of the electronic component so as to match the size reduction of the connection object.

Solution to Problem

To achieve the above object, the present invention provides an electronic component as described below.

The electronic component according to the present invention includes a first terminal to be inserted into a first connection chamber formed in a connection housing of a connector, a second terminal to be inserted into a second connection chamber formed in the connection housing, and a retention housing having a retention wall for retaining the first terminal and the second terminal. In the electronic component, the first terminal and the second terminal have respective connector-connection portions that extend from one side of the retention wall toward the connector and also have respective external connection portions that extend from the other side of the retention wall. In addition, the first terminal and the second terminal are configured such that a clearance between the connector-connection portions being adjacent to each other is larger than a clearance between the external connection portions being adjacent to each other.

According to the electronic component of the present invention, the first terminal and the second terminal are configured such that the clearance between the connector-connection portions being adjacent to each other is larger than the clearance between the external connection portions being adjacent to each other. Accordingly, while the external connection portions can match the narrow spacing of the connector terminals of a connection object (for example, the harness, or the harness connector) to be connected to the external connection portions, the connector-connection portions can also match the spacing between the first connection chamber and the second connection chamber of the connection housing of the connector or a connection object. In addition, while the external connection portions match the size reduction of the connection object to be connected thereto, the connector-connection portions can secure an effective amount of guiding allowance by maintaining the area of the guide surfaces of the connector to be connected to the connector-connection portions.

The electronic component may be configured such that at least one of the first terminal and the second terminal has a bent portion that causes the clearance between the connector-connection portions to be larger than the clearance between the external connection portions.

According to the electronic components of the present invention, the bent portions can be formed by bending respective metal pieces, such as straight pins, that form the first terminal and the second terminal, which thereby enables various bent shapes to be formed easily with a high accuracy. Accordingly, the clearance of adjacent connector-connection portions and the clearance of adjacent external connection portions can be set at predetermined amounts.

The bent portion of the electronic component may be bent so as to cause the clearance between the first terminal and the second terminal to be spaced from each other in an arrangement direction of the first terminal and the second terminal.

According to the electronic components of the present invention, the bent portion is bent so as to cause the first terminal and the second terminal to be spaced from each other in the arrangement direction (Y direction) of the first terminal and the second terminal. Accordingly, the clearance of the external connection portions can be reduced in the arrangement direction (Y direction), which enables size reduction, in the arrangement direction (Y direction), of the connection object to be connected to the external connection portions.

The electronic component may be configured such that a plurality of the first terminals are disposed in parallel rows, and the bent portions of the first terminals that are spaced from each other are bent so as to cause the first terminals to be spaced from each other in a row-wise direction of the first terminals.

According to the electronic components of the present invention, the bent portions of the mutually spaced first terminals are bent so as to cause the first terminals to be spaced more from each other in the row-wise direction (X direction) of the first terminals, which enables reduction of the clearance between the external connection portions of the first terminals that are adjacent to each other in the row-wise direction (X direction) of the first terminals and thereby enables size reduction, in the row-wise direction (X direction), of the connection object to be connected to the external connection portions.

The electronic component may be configured such that the second terminals are disposed in parallel rows and the bent portions of the second terminals that are adjacent to each other are bent so as to cause the second terminals to be spaced from each other in a row-wise direction of the second terminals.

According to the electronic components of the present invention, the bent portions of the mutually spaced second terminals are bent so as to cause the second terminals to be spaced more from each other in the row-wise direction (X direction) of the second terminals, which enables reduction of the clearance between the external connection portions of the second terminals that are adjacent to each other in the row-wise direction (X direction) of the second terminals and thereby enables size reduction, in the row-wise direction (X direction), of the connection object to be connected to the external connection portions.

The electronic component may be configured such that a plurality of the first terminals and a plurality of the second terminals may be respectively disposed in parallel rows and such that bent portions of adjacent first terminals may be bent so as to cause the adjacent first terminals to be spaced from each other in a row-wise direction (X direction) of the first terminals and bent portions of adjacent second terminals may be bent so as to cause the adjacent second terminals to be spaced from each other in a row-wise direction (X direction) of the second terminals.

According to the electronic components of the present invention, the size of the connection object to be connected to the external connection portions can be reduced in the row-wise direction (X direction) of the first terminals and the second terminals.

The electronic component may be configured such that a plurality of the first terminals and a plurality of the second terminals are respectively disposed in parallel rows and such that the bent portions of the first terminals and the bent portions of the second terminals are respectively bent so as to cause the first terminals and the second terminals to be spaced from each other in the arrangement direction (Y direction) of the first terminals and the second terminals and also to be spaced from each other in corresponding row-wise directions (X directions) of the first terminals and the second terminals.

According to the electronic components of the present invention, the bent portions of the first terminals and the second terminals are respectively bent so as to cause the first terminals and the second terminals to be spaced from each other in the arrangement directions (Y directions) of the first terminals and the second terminals and also to be spaced from each other in corresponding row-wise directions (X directions) of the first terminals and the second terminals, which enables reduction of the clearance between adjacent external connection portions both in the arrangement direction (Y direction) and in the row-wise direction (X direction). Accordingly, the size of the connection object to be connected to the external connection portions can be reduced both in the arrangement direction (Y direction) and in the row-wise direction (X direction).

The electronic component may be configured such that the retention wall includes an embedment portion in which each bent portion is buried.

For example, if the bent portions are exposed to the outside of the retention wall, an insertion force may act on the bent portions having bent shapes and may bend or break the bent portions when the external connection portions are connected to the connection object or when the connector-connection portions are connected to the connector. In addition, in a configuration in which the bent portions are exposed to the outside of the retention wall, the connection object and the connector cannot be inserted to the extent that the connection object and the connector pass the bent portions and abut the retention wall, which leads to an increase in the size of the connector in the insertion direction. According to the present invention, however, the bent portions are held by the embedment portion of the retention wall, which enables a reliable electric connection to the external connection portions and to the connector-connection portions without being bent or broken. Moreover, this enables the connection object and the connector to be inserted so as to abut the retention wall, which thereby suppresses the size increase of the connector in the insertion direction. Furthermore, when the connection object and the connector are pulled out, pull-out forces of pulling the first terminals and the second terminals act on the retention wall. However, the bent portion are caught in the embedment portion, and the first terminals and the second terminals are thereby prevented from being pulled out of the retention wall.

The electronic component according to the present invention may further include a movable connector that serves as the connector. The movable connector may have a stationary housing, a movable housing serving as the connection housing, and terminals that displaceably support the movable housing with respect to the stationary housing.

According to the electronic components of the present invention, the connector is the movable connector, and the movable housing is displaceable with respect to the stationary housing. As a result, when the connector-connection portions of the first terminals and the second terminals are respectively inserted into the first connection chambers and the second connection chambers of the movable housing, the displacement of the movable housing can absorb mutual positional deviation during insertion.

Advantageous Effects of Invention

According to the electronic component of the present invention, the connector-connection portions can be reliably connected due to the guide surfaces of the connector guiding the connector-connection portions while the size of the connection object to be connected to the external connection portions of the first terminals and the second terminals is reduced.

In addition, according to the electronic component that includes the movable connector, it is not necessary to reduce the size of the movable connector to be connected to the connector-connection portions. Accordingly, the external connection portions can be connected to the downsized connection object, while the movable housing can have a sufficient amount of guiding allowance and thereby absorb the positional deviation of the connector-connection portions during insertion.

BRIEF DESCRIPTION OF DRAWINGS

FIG. 4 are diagrams for explaining a first terminal and a second terminal that are included in the electronic component of FIG. 1, in which FIG. 4A is a plan view, FIG. 4B is a front view, FIG. 4C is a bottom view, and FIG. 4D is a right side view.

DESCRIPTION OF EMBODIMENTS

Figure 1:
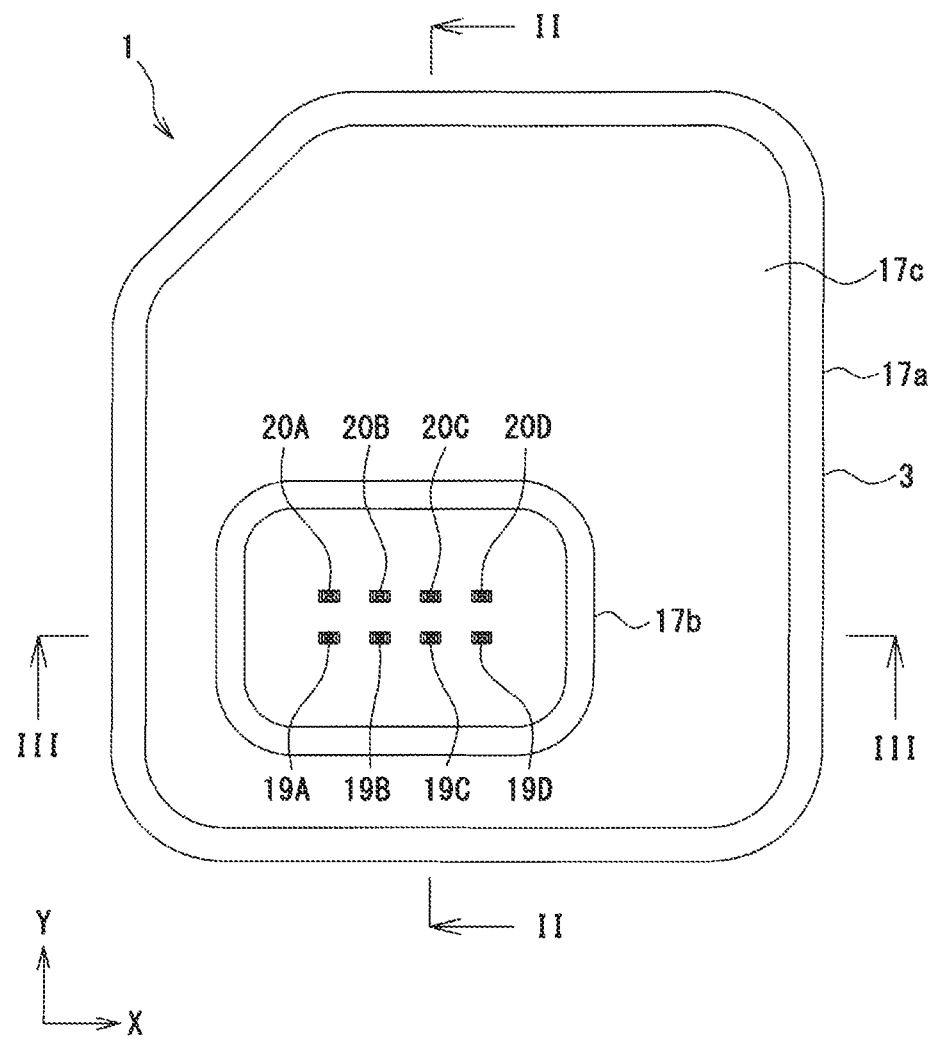
FIG. 1 is a plan view illustrating an electronic component according to an embodiment.

An embodiment of an electronic component according to the present invention will be described with reference to the drawings. In the embodiment below, an example in which an electronic component of the present invention is applied to a camera module 1 will be described. However, the electronic component of the present invention is not limited to such an example.

In the present specification and claims, terms "first" and "second" are used to distinguish different elements of the invention from each other and are not used to imply a specific order nor to imply that one is better than the other. In the present specification and claims, as illustrated in the drawings, the X direction represents the width direction or the right-left direction of a relay connector 8 included in the camera module 1, the Y direction represents the depth direction or the front-rear direction of the relay connector 8, and the Z direction represents the height direction or the up-down direction of the relay connector 8. However, the definitions of the above directions are provided for convenience of explanation and should not be construed as limiting the direction in which the camera module 1 is mounted or is used.

Camera Module 1

The camera module 1 is, for example, a component constituting a vehicle-mounted camera mounted on an automobile or the like. The camera module 1 includes an external connection case 3, which serves as a "retention housing", and an imaging component case 4. The external connection case 3 retains multiple pin terminals 2, which serve as "terminals" to be electrically connected to an external device. Both the external connection case 3 and the imaging component case 4 are formed into box shapes so as to be engageable with each other and can be fixed to each other by using a fixation member, such as a screw.

Imaging Component Case 4

Figure 2:
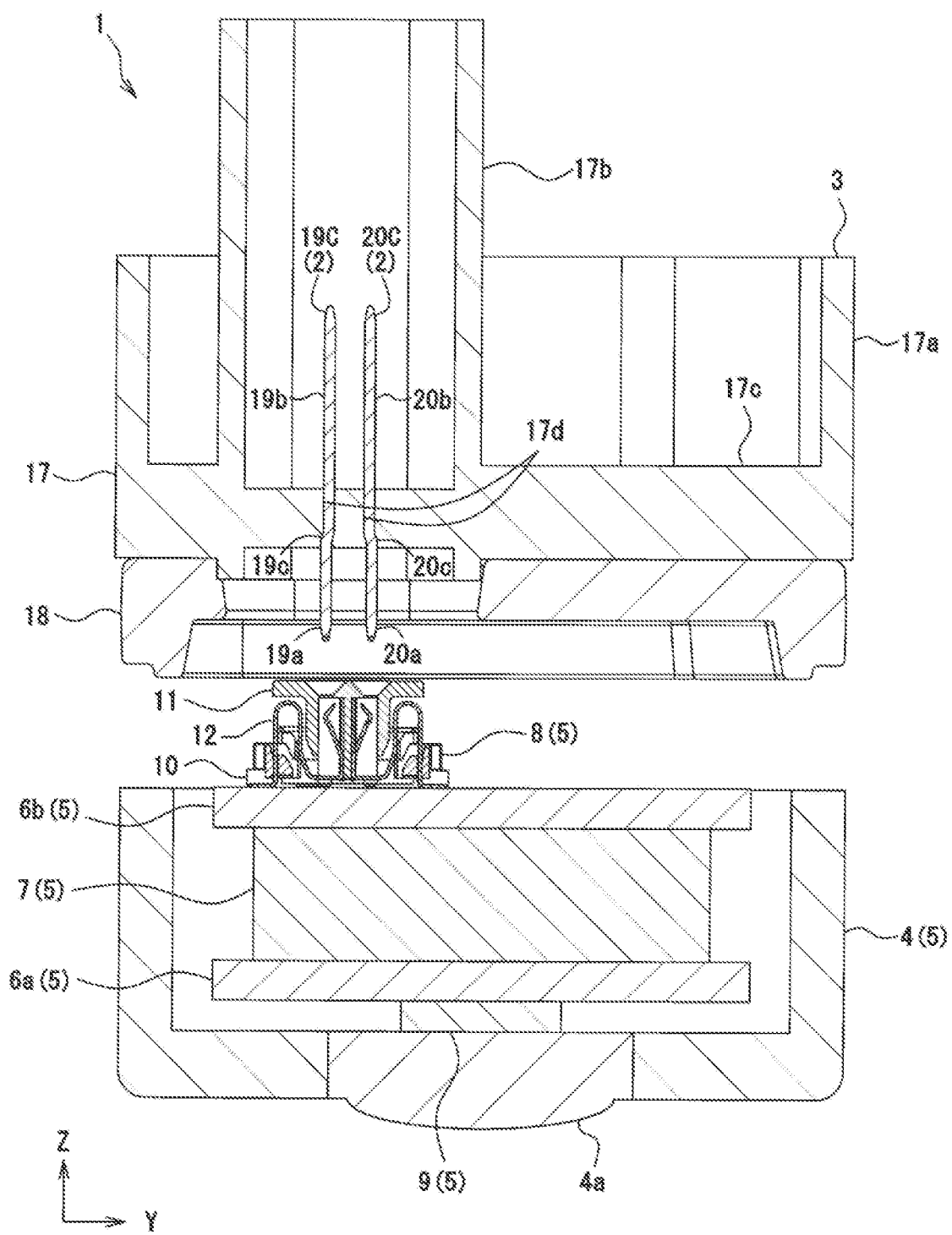
FIG. 2 is a cross section of the electronic component, which is cut along line II-II in FIG. 1 and turned 90 degrees rightward.
Figure 3:
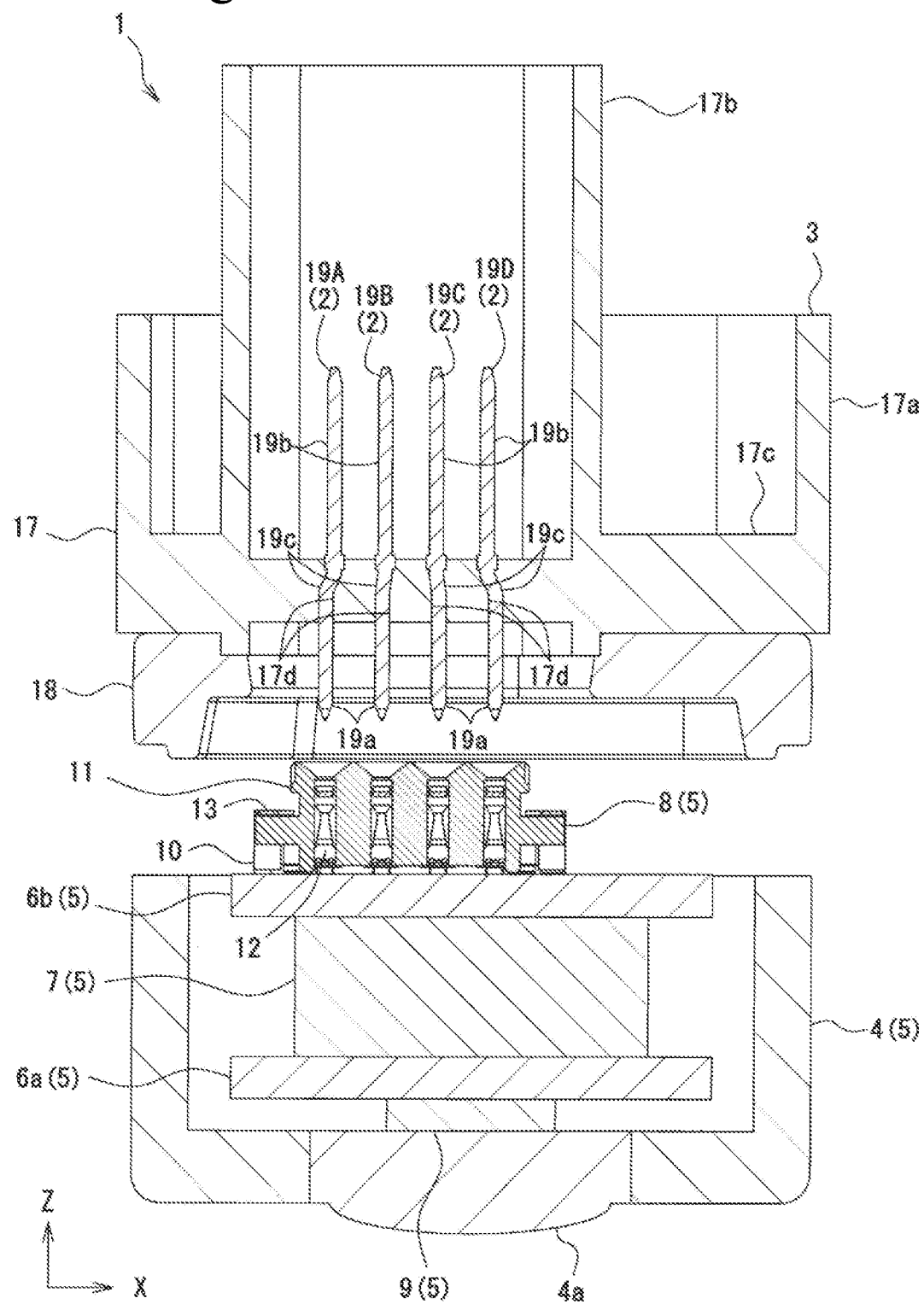
FIG. 3 is a cross section of the electronic component cut along line III-III in FIG. 1.

The imaging component case 4 is formed into a box shape and has a bottom wall at the bottom side thereof (in the Z direction) in FIG. 2. The imaging component case 4 includes optical components 4a, such as a lens unit, and imaging components 5 disposed inside the imaging component case 4.

Imaging Component 5

The imaging components 5 includes substrates 6a and 6b having various electronic devices and circuit wiring, an internal connector 7 that connect the substrates 6a and 6b to each other, a relay connector 8 mounted on the substrate 6b, and an image sensor 9 mounted on the lower surface of the substrate 6a. The relay connector 8 serves as a "connector" according to the present invention. The image sensor 9 converts light coming from the optical components 4a into electric signals and outputs the electric signals to an external device. The image sensor 9 is an imaging device, such as a charge coupled device (CCD) or a complementary metal oxide semiconductor (CMOS).

Relay Connector 8

The relay connector 8 is mounted on the upper surface of the substrate 6b and has a function of connecting the imaging components 5 to an external device through the pin terminals 2 and outputting electric signals generated by the imaging components 5 to the external device.

The relay connector 8 includes a stationary housing 10, a movable housing 11 serving as a "connection housing" of the present invention, multiple terminals 12, and fixation metal fittings 13. The relay connector 8 is configured such that the stationary housing 10 is mounted on the substrate 6b and the movable housing 11 is supported by the terminals 12 so as to be able to move relative to the stationary housing 10. In other words, the relay connector 8 is configured as a floating connector (movable connector) in which the movable housing 11 is movable relative to the stationary housing 10 in three-dimensional directions in which the X, Y, and Z directions are combined.

Stationary Housing 10

Figure 5:
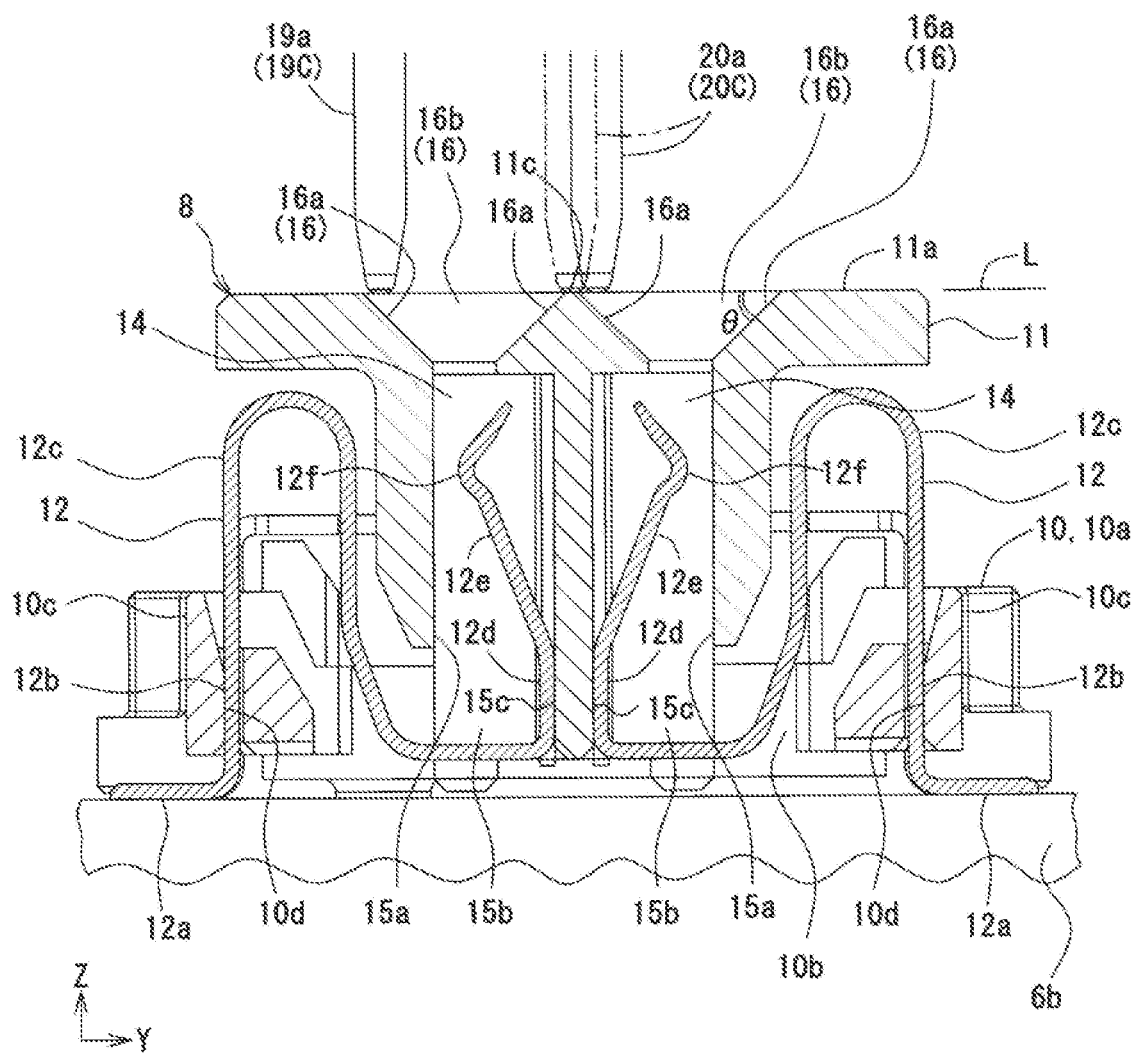
FIG. 5 is a cross-sectional view corresponding to FIG. 2 for explaining operation of the electronic component of FIG. 1.
Figure 6:
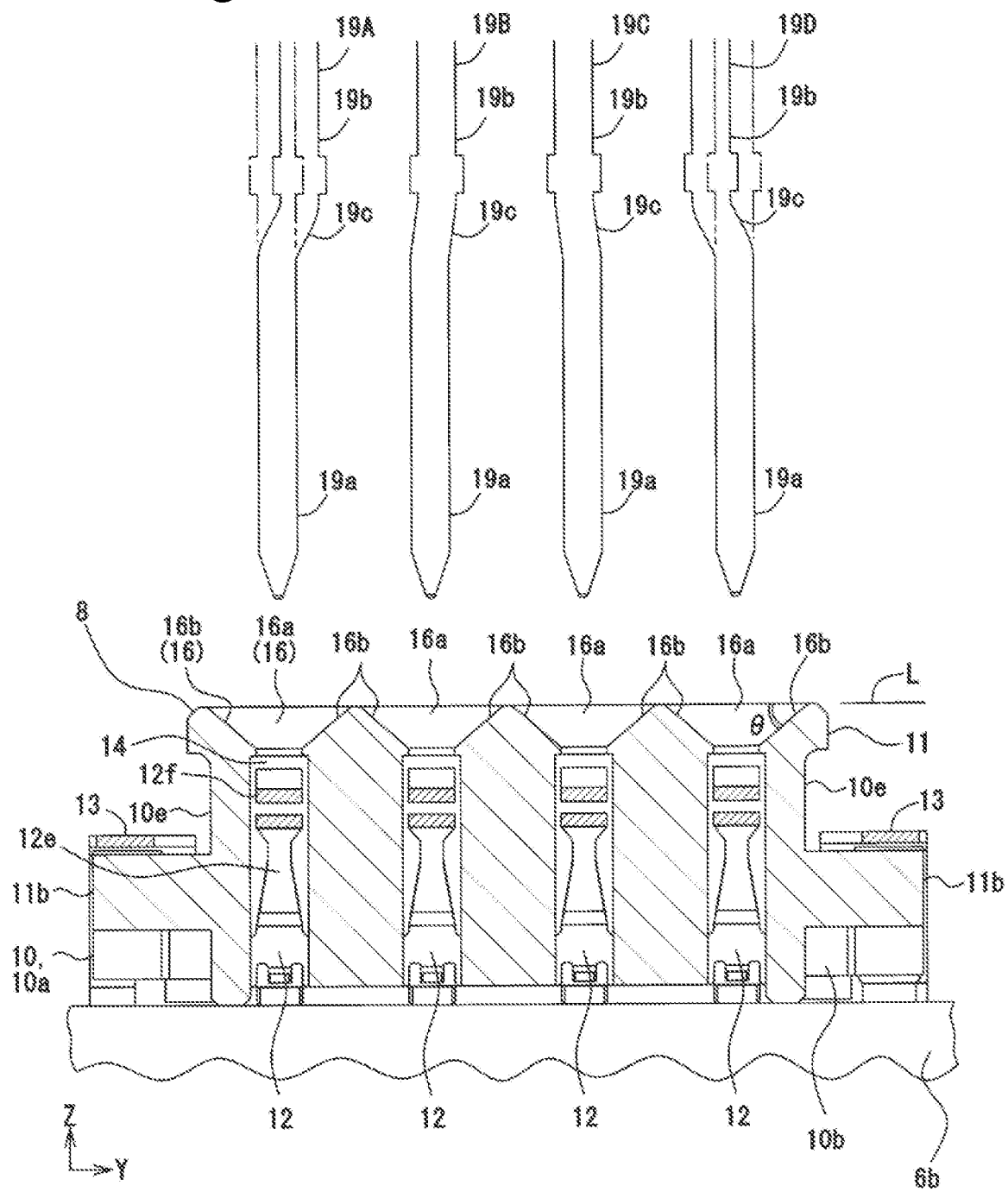
FIG. 6 is a cross-sectional view corresponding to FIG. 3 for explaining operation of the electronic component of FIG. 1.
Figure 7:
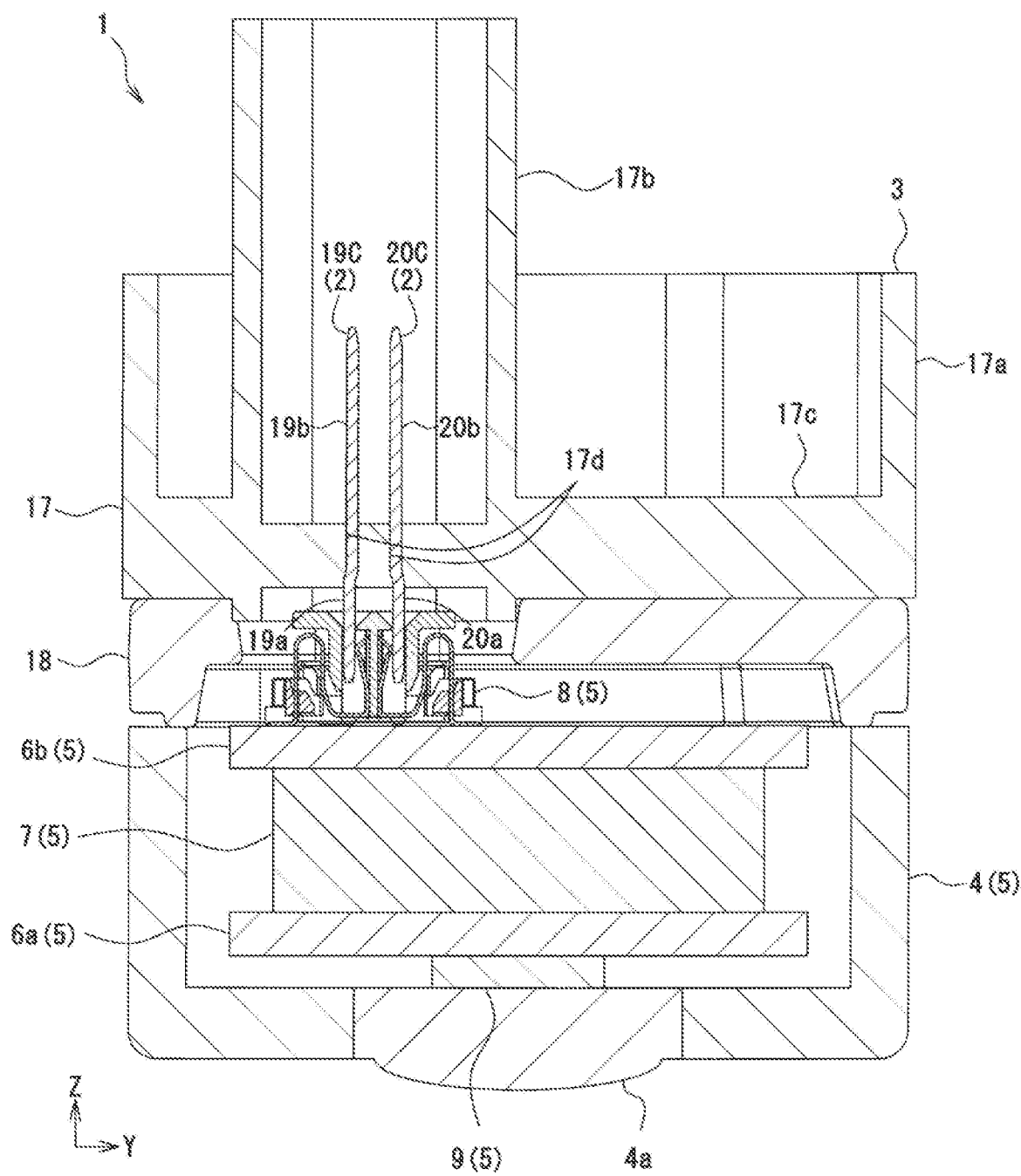
FIG. 7 is a cross-sectional view corresponding to FIG. 2, which illustrates a state of engagement and connection of the electronic component of FIG. 1.

The stationary housing 10 is formed of a frame-like circumferential wall 10a, inside which an accommodation chamber 10b for the movable housing 11 is formed (FIGS. 5 and 6).

Multiple terminal fixation portions 10d are formed (FIG. 5) at both side walls 10c of the circumferential wall 10a that extend in the longitudinal direction (X direction) of the circumferential wall 10a. The terminal fixation portions 10d extend in the height direction (Z direction) of the stationary housing 10 and are arranged in parallel rows extending in the terminal arrangement direction (X direction). One end portion of each terminal 12 (i.e., a stationary-housing fixation portion 12b) is press-fitted into a corresponding terminal fixation portion 10d. The fixation metal fittings 13 are fixed to both side walls 10e of the circumferential wall 10a that extend in the lateral direction (Y direction) of the circumferential wall 10a (see FIG. 6).

Movable Housing 11

The movable housing 11 is shaped like a cuboid so as to follow the circumferential wall 10a of the stationary housing 10. Multiple connection chambers 14, the number of which is the same as that of the pin terminals 2, are formed in the movable housing 11 for electrical connection with the pin terminals 2 included in the external connection case 3. The movable housing 11 according to the present embodiment includes four connection chambers 14 disposed in the width direction (X direction) and two connection-chamber rows disposed in the depth direction (Y direction). Accordingly, a total of eight connection chambers 14 are formed. In other words, the connection chambers 14 are formed in line-symmetry with respect to a longitudinal center line of the movable housing 11. As described later again, connection chambers 14 into which first pin terminals 19 (19A to 19D) are inserted correspond to "first connection chambers" according to the present invention, and connection chambers 14 into which second pin terminals 20 (20A to 20D) are inserted correspond to "second connection chambers" according to the present invention.

Each of the connection chambers 14 is formed so as to pierce the movable housing 11 in the height direction (Z direction) and so as to have a quadrangle cross section when cut horizontally (X and Y directions). Each connection chamber 14 has a side wall 15a extending in the X direction and side walls 15b extending in the Y direction. Terminal fixation portions 15c are formed on the side walls 15b of the connection chamber 14. The other end portion of each terminal 12 (i.e., a movable-housing fixation portion 12d) is press-fitted into the terminal fixation portions 15c.

Guide surfaces 16, which guide a corresponding pin terminal 2, are formed in an upper portion of the connection chamber 14. In the connection chamber 14, the guide surfaces 16 form an insertion mouth that opens from a top surface 11a of the movable housing 11 so as to be able to receive a pin terminal 2. The guide surfaces 16 include a pair of longitudinal-side guide surfaces 16a that extend in the longitudinal direction (X direction) of the relay connector 8 and also include a pair of lateral-side guide surfaces 16b that extend in the lateral direction (Y direction) of the relay connector 8. The guide surfaces 16 are formed as tapered surfaces (recessed surfaces), which shapes the guide surfaces 16 into a truncated pyramid.

Here, reference line L is defined as a line orthogonally intersecting the insertion direction of the pin terminal 2 (FIGS. 5 and 6). The angle θ that the top surface 11a of the movable housing 11 forms with reference line L is 0 degrees. Each guide surface 16 is a declining surface with respect to the top surface 11a and the angle θ of the guide surface 16 is set at an acute angle of, for example, 45 degrees. In other words, the width of each guide surface 16 is formed so as to become wider from the deeper end of the guide surface 16 positioned deeper in the connection chamber 14 to the insertion end thereof for receiving the pin terminal 2. If a pin terminal 2 is pressed downward (in the Z direction) against a surface having an angle θ of 0 degrees, a component force in a horizontal direction (X and Y directions) does not occur. On the other hand, if the pin terminal 2 is pressed down in the Z direction against a guide surface 16 having an acute angle θ, a component force acting in a direction of the pin terminal 2 sliding down into the connection chamber 14 occurs, and a component force pressing the pin terminal 2 in a direction opposite to the direction of the pin terminal 2 sliding down the movable housing 11 also occurs, which can thereby guide the pin terminal 2 down into the connection chamber 14 smoothly. Accordingly, as the angle θ becomes greater within a range of 0 to 90 degrees, the sliding resistance becomes smaller, which leads to smooth insertion of the pin terminal 2.

Note that in the present embodiment, each guide surface 16 is formed as a flat surface by way of example, but the guide surface 16 may be formed as a curved surface. For example, if each guide surface 16 is formed as a curved surface that swells upward (in the Z direction), the reaction force that the pin terminal 2 receives becomes smaller as the pin terminal 2 advances into the connection chamber 14, which enables the pin terminal 2 to be inserted smoothly into the connection chamber 14.

Displacement-control protrusions 11b are formed in the movable housing 11 so as to protrude outward in the width direction (X direction) (FIG. 6). The displacement-control protrusions 11b come into contact with the stationary housing 10 in the X and Y directions and in the Z direction (downward) and come into contact with a fixation metal fitting 13 in the Z direction (upward), which thereby restricts excessive displacement of the movable housing 11.

Terminal 12

The terminals 12 are formed into the same shape by bending pieces of an electrically conductive metal. Each terminal 12 includes a substrate connection portion 12a, a stationary-housing fixation portion 12b, a spring portion 12c, a movable-housing fixation portion 12d, an elastic arm 12e, and a contact portion 12f. The substrate connection portion 12a is soldered to the substrate 6b. The stationary-housing fixation portion 12b is fixed, by press-fitting, to a corresponding terminal fixation portion 10d of the stationary housing 10. The spring portion 12c extends so as to form an inverted U-shape. The movable-housing fixation portion 12d is press-fitted, in the width direction of the metal piece (X direction), to the terminal fixation portions 15c of the movable housing 11 and fixed thereto. The elastic arm 12e extends from the upper end of the movable-housing fixation portion 12*d*. The contact portion 12*f* is formed at the end of the elastic arm 12*e* and is bent so as to form a chevron shape.

The spring portion 12*c* is formed as a spring that displaceably supports the movable housing 11 relative to the stationary housing 10 in three dimensional directions in which the width direction (X direction), the depth direction (Y direction), and the height direction (Z direction) are combined.

The elastic arm 12*e* and the contact portion 12*f* are accommodated in each connection chamber 14 and pressed against the pin terminal 2 inserted in the connection chamber 14 and thereby brought into electrical contact therewith. In other words, each pin terminal 2 is inserted into the connection chamber 14 and comes into press contact with the contact portion 12*f*, which produces a counter spring force (reaction force) of the elastic arm 12*e* against the pin terminal 2 and thereby brings the contact portion 12*f* into contact with the pin terminal 2 at a predetermined contact pressure. A good electrical contact is thus obtained.

External Connection Case 3

The external connection case 3 includes a first case 17, a second case 18, and multiple pin terminals 2. The external connection case 3 serves as a "retention housing" according to the present invention, and the multiple pin terminals 2 constitute "first terminals" and "second terminals". The first case 17 includes an outer tube 17*a*, an inner tube 17*b*, and a partition wall 17*c* that serves as a "retention wall". A harness connector disposed in a harness that extends from an external device (not illustrated) is inserted into the inner tube 17*b* and engageably connected thereto. An accommodation portion (not illustrated) of the harness connector is connected to the outer tube 17*a*. The partition wall 17*c* has an embedment portion 17*d* that holds the multiple pin terminals 2 that are embedded therein. The first case 17 is formed as a molded body of a hard resin. The pin terminals 2 are disposed integrally with the partition wall 17*c* of the first case 17 by insert molding. The second case 18 is also formed of an annularly molded body of a hard resin. The second case 18 is integrated with the first case 17 by using a fixation means such as an adhesive. Note that although the first case 17 and the second case 18 are described, by way of example, as separate molded bodies in forming, the first case 17 and the second case 18 may be formed as one molded body.

Specifically, the pin terminals 2 include multiple first pin terminals 19 serving as "first terminals" that are disposed in the width direction (X direction). The pin terminals 2 also includes multiple second pin terminals 20 serving as "second terminals" that are disposed also in the width direction (X direction). A row of the first pin terminals 19 and a row of the second pin terminals 20 are disposed side by side in the depth direction (Y direction). Each of the first pin terminals 19 has a connector-connection portion 19*a* extending from the lower surface of the partition wall 17*c* toward the imaging component case 4 and also has an external connection portion 19*b* extending from the upper surface of the partition wall 17*c* in a direction opposite to the connector-connection portion 19*a*. Each first pin terminal 19 also has a bent portion 19*c* that is embedded in the partition wall 17*c*. Each of the second pin terminals 20 has a connector-connection portion 20*a*, an external connection portion 20*b*, and a bent portion 20*c*, which are similar to those of the first pin terminal 19.

Each of the connector-connection portions 19*a* and 20*a* is shaped like a truncated pyramid having a tapered end. The guide surfaces 16 of the movable housing 11 are also shaped as tapered surfaces of a truncated pyramid. The truncated pyramid of each of the connector-connection portions 19*a* and 20*a* has four corners shaped similar to those of the guide surfaces 16, which facilitates engagement with each other. This can absorb larger positional deviation of individual first pin terminals 19 and second pin terminals 20 during insertion compared with a case in which the end portions of the connector-connection portions 19*a* and 20*a* are shaped roundly.

In the present embodiment, as illustrated in FIG. 4B, a row of the first pin terminals 19 and a row of the second pin terminals 20 include respective four pins that are arranged side by side in the X direction. The first pin terminals 19 are named, from left to right, a far-left pin terminal 19A, a center-left pin terminal 19B, a center-right pin terminal 19C, and a far-right pin terminal 19D, and the second pin terminals 20 are named, from left to right, a far-left pin terminal 20A, a center-left pin terminal 20B, a center-right pin terminal 20C and a far-right pin terminal 20D. Clearances D1 between adjacent external connection portions 19*b* in the X direction and clearances D1 between adjacent external connection portions 20*b* in the X direction are the same length. In addition, bent portions 19*c* and 20*c* of corresponding center-left pin terminals 19B and 20B and bent portions 19*c* and 20*c* of corresponding center-right pin terminals 19C and 20C are bent in directions opposite to each other but have the same amount of bending. Moreover, bent portions 19*c* and 20*c* of corresponding far-left pin terminals 19A and 20A and bent portions 19*c* and 20*c* of corresponding far-right pin terminals 19D and 20D are bent in directions opposite to each other but have the same amount of bending. The bent portions 19*c* and the bent portions 20*c* are bent in the X direction as described above, which thereby equalizes clearances D2 between adjacent connector-connection portions 19*a* and between adjacent connector-connection portions 20*a* and makes the clearances D2 larger than the clearances D1.

The far-left pin terminals 19A and 20A are adjacent to each other in the Y direction. Similarly, the center-left pin terminals 19B and 20B, the center-right pin terminals 19C and 20C, and the far-right pin terminals 19D and 20D are respectively adjacent to each other in the Y direction. The clearance D3 between the external connection portions 19*b* and 20*b* of the mutually adjacent pin terminals is made smaller than the clearance D4 between the connector-connection portions 19*a* and 20*a* of the mutually adjacent pin terminals. This is because the bent portions 19*c* and 20*c* are formed so as to have twistedly bent shapes that are bent both in the X and Y directions. The amount of bending in the Y direction is the same for all of the pin terminals 19 and 20.

Operation and Effect of Camera Module 1

Next, operation and advantageous effects of the camera module 1 will be described except for what has been described.

The pin terminals 19 and 20 have respective bent portions 19*c* and 20*c* that are bent in the X and Y directions. The clearance D1 between adjacent external connection portions 19*b* and between adjacent external connection portions 20*b*, which are adjacent to each other in the X direction, in other words, in the row-wise direction of the first pin terminals 19, are made smaller than the clearance D2 between the adjacent connector-connection portions 19*a* and between the adjacent connector-connection portions 20*a* in the X direction, respectively. Moreover, the clearance D3 between the external connection portions 19*b* and 20*b* that are adjacent to each other in the Y direction is made smaller than the clearance D4 between the connector-connection portions 19*a* and 20*a* that are adjacent to each other in the Y direction. Accordingly, the camera module 1 is configured such that in contrast to a case in which bent portions are not formed as indicated by dash-dot-dot lines in FIG. 6, the external connection portions 19b and 20b can match, and be connected to, a downsized harness connector (not illustrated) of which the size is reduced in the X and Y directions, while the connector-connection portions 19a and 20a can be connected appropriately to the relay connector 8.

In the camera module 1, the clearances D2 and D4 of the connector-connection portions 19a and 20a can be increased in the X and Y directions due to the presence of the bent portions 19c and 20c even if the size of the harness connector is reduced as described above. Reducing the overall size of the relay connector 8 poses a problem that a clearance between adjacent connection chambers 14 of the movable housing 11 becomes smaller, which causes the angle θ of the declining guide surfaces 16 to increase and causes the size of each guide surface 16 to decrease in the X and Y directions. This reduces a guiding allowance within which the guide surfaces 16 can guide each of the connector-connection portions 19a and 20a, which thereby reduces the allowance for deviation of each of the connector-connection portions 19a and 20a with respect to the insertion axis of the corresponding connection chamber 14. However, such a problem does not occur in the camera module 1. In the relay connector 8 that is a movable connector, a large amount of the guiding allowance for the guide surfaces 16 in the X and Y directions leads to the amount of displacement of the spring portion 12c in the X and Y directions. Accordingly, the relay connector 8 can take full advantage of each spring portion 12c capable of being displaced in the X and Y directions. Moreover, displacement of the spring portion 12c can absorb accumulated allowable errors occurring during assembly of the electric device. Moreover, if the size of the movable housing 11 of FIG. 5 is reduced, for example, in the Y direction, the inclination angle of elastic arm 12e of each terminals 12 becomes small with respect to the insertion direction of the connector-connection portions 19a and 20a (Z direction), and the chevron-like contact portion 12f needs to have a shallowly bent shape, which limits the amount of displacement of the contact portion 12f and may not provide a contact pressure necessary for good contact between the contact portion 12f and the corresponding one of the connector-connection portions 19a and 20a. However, as described above, it is not necessary to reduce the size of the movable housing 11, and a good contact can be reliably obtained without sacrificing the contact pressure of contact portion 12f of the terminals 12.

The bent portions 19c and 20c can be formed by bending the metal pieces, such as straight pins, that form the first pin terminals 19 and the second pin terminals 20. Various bent shapes can be formed easily with a high accuracy. Accordingly, the clearances D2 and D4 of adjacent connector-connection portions 19a and 20a and the clearance D1 and D3 of adjacent external connection portions 19b and 20b can be set at predetermined amounts.

The bent portions 19c and 20c are buried in the embedment portion 17d of the partition wall 17c and are not exposed to the outside of the partition wall 17c. If the bent portions 19c and 20c are exposed to the outside of the partition wall 17c, an insertion force may act on the bent portions 19c and 20c having bent shapes and may bend or break the bent portions 19c and 20c when the external connection portions 19b and 20b are connected to the harness connector or when the connector-connection portions 19a and 20a are connected to the relay connector 8. In this case, the harness connector and the relay connector 8 cannot be inserted to the extent that the harness connector and the relay connector 8 pass the bent portions 19c and 20c and abut the partition wall 17c. In the camera module 1, on the other hand, the bent portions 19c and 20c are buried in and retained by the embedment portion 17d of the partition wall 17c, which can provide a reliable electric connection with the external connection portions 19b and 20b and the connector-connection portions 19a and 20a without being bent or broken. Moreover, this enables the harness connector and the relay connector 8 to be inserted so as to abut the partition wall 17c, which thereby suppresses the size increase of the camera module 1 in the insertion direction. Furthermore, when the harness connector or the relay connector 8 is pulled out, pull-out forces of pulling the first pin terminals 19 and the second pin terminals 20 act on the partition wall 17c. However, the bent portions 19c and 20c are caught in the embedment portion 17d, and the first pin terminals 19 and the second pin terminals 20 are thereby prevented from being pulled out of the partition wall 17c.

Modification Example of the Embodiment

The camera module 1 described above can be implemented in various modified forms. One modification example will be described below.

In the above embodiment, the number of the pin terminals 2 is described as eight by way of example. However, the number of the pin terminals 2 may be any number insofar as it is two or more.

In the above embodiment, the clearances D2 between adjacent connector-connection portions 19a and between adjacent connector-connection portions 20a are described as being the same length by way of example. However, each clearance D2 may be made different. For example, the clearance D2 between the far-left pin terminal 19A and the center-left pin terminal 19B may be made large, and other clearances D2 may be made smaller. In addition, some of the clearances D4 may be made large and some of the clearances D4 may be made small. With this configuration, the connection chambers 14 formed in the movable housing 11 of the relay connector 8 can be provided in various different forms. These modification examples can be applied equally to the external connection portions 19b and 20b, which can increase the variety of shapes of the harness connector.

In the above embodiment, all of the bent portions 19c and 20c of the pin terminals 2 are described as having twistedly bent shapes that are bent both in the X and Y directions by way of example. However, the bent portions 19c and 20c may be bent only in the X direction or only in the Y direction. In addition, one of adjacent pin terminals 2 may be shaped like a straight pin without having a bent portion, and the other one of the adjacent pin terminals 2 may have a bent portion.

In the above embodiment, the angle θ with respect to the top surface 11a (reference line L) of the movable housing 11 is described, by way of example, as being the same for all of the longitudinal-side guide surfaces 16a and the lateral-side guide surfaces 16b of the guide surfaces 16. However, the angle θ may be set differently for each surface.

In the above embodiment, it is described by way of example that almost no gap is provided between the circumferential surface of each of the connector-connection portions 19a and 20a and the edge of each bottom end opening of the guide surfaces 16 in the engagement state in which the connector-connection portions 19a and 20a of the pin terminals 2 are inserted in the connection chambers 14. However, the engagement may be achieved in a state in which the opening area of the bottom end opening is expanded and a gap is thereby provided between the circumferential surface of each of the connector-connection portions 19a and 20a and the edge of each bottom end opening of the guide surfaces 16. In other words, the shapes of the connection chambers 14 including the guide surfaces 16 may be modified in such a manner that the pin terminals 2 can be inserted into the connection chambers 14 and can come into electrical contact with the contact portions 12f even if the pin terminals 2 are straight pins having no bent portions 19c and 20c and have the same amount of clearance between adjacent external connection portions and between adjacent connector-connection portions. In this case, if, for example, the first pin terminals 19 and the second pin terminals 20 are straight pins having no bent portions and have a clearance D3 between the connector-connection portions 19a and 20a of the center-right pin terminals 19C and 20C, as indicated by the dash-dot-dot line in FIG. 5, the end of the connector-connection portion 20a of the center-right pin terminal 20C may abut a central surface 11c that extends in the longitudinal direction on the top surface 11a of the movable housing 11 when the end of connector-connection portion 19a of the center-right pin terminal 19C is located above the top end of the longitudinal-side guide surface 16a. In this case, both of the connector-connection portions 19a and 20a cannot enter the connection chambers 14, and the connector-connection portion 20a abuts the central surface 11c and may buckle. In the above embodiment, however, the pin terminals 2 have the bent portions 19c and 20c. As a result, even if the shapes of the connection chambers 14 including the guide surfaces 16 may be modified as described above, the connector-connection portions 19a and 20a can be simultaneously brought into contact with the guide surfaces 16 without coming into contact with the central surface 11c as indicated by the solid line in FIG. 5.

REFERENCE SIGNS LIST 1 camera module (electronic component)
2 pin terminal (first terminal, second terminal)
3 external connection case (retention housing)
4 imaging component case
4a optical component
5 imaging component
6a substrate
6b substrate
7 internal connector
8 relay connector (connector)
9 image sensor
10 stationary housing
10a circumferential wall
10b accommodation chamber
10c side wall
10d terminal fixation portion
10e side wall
11 movable housing (connection housing)
11a top surface
11b displacement-control protrusion
11c central surface
12 terminal
12a substrate connection portion
12b stationary-housing fixation portion
12c spring portion
12d movable-housing fixation portion
12e elastic arm
12f contact portion
13 fixation metal fitting
14 connection chamber (first connection chamber, second connection chamber)
15a side wall
15b side wall
15c terminal fixation portion
16 guide surface
16a longitudinal-side guide surface
16b lateral-side guide surface
17 first case
17a outer tube
17b inner tube
17c partition wall (retention wall)
17d embedment portion
18 second case
19 first pin terminal (first terminal)
19A far-left pin terminal
19B center-left pin terminal
19C center-right pin terminal
19D far-right pin terminal
19a connector-connection portion
19b external connection portion
19c bent portion
20 second pin terminal (second terminal)
20A far-left pin terminal
20B center-left pin terminal
20C center-right pin terminal
20D far-right pin terminal
20a connector-connection portion
20b external connection portion
20c bent portion
D1 to D4 clearance
L reference line
θ angle
X width direction, right-left direction
Y depth direction, front-rear direction
Z height direction, up-down direction

The invention claimed is:
1. An electronic component for a camera module comprising:
   a retention housing having a retention wall for retaining a first terminal to be inserted into a first connection chamber and a second terminal to be inserted into a second connection chamber;
   an imaging component case which is engageable to the retention housing, and which has a movable connector, the movable connector having
   terminals,
   a fixed housing, and
   a movable housing which is supported displaceably by the terminals with respect to the fixed housing, and which forms the first connection chamber and the second connection chamber therein,
   wherein
   the first terminal and the second terminal have respective connector-connection portions that extend from one side of the retention wall toward the movable connector and also have respective external connection portions that extend from the other side of the retention wall, and
   the first terminal and the second terminal are configured such that a clearance between the connector-connection portions being adjacent to each other is larger than a clearance between the external connection portions being adjacent to each other.
2. The electronic component according to claim 1, wherein at least one of the first terminal and the second terminal has a bent portion that causes the clearance between the connector-connection portions to be larger than the clearance between the external connection portions.

3. The electronic component according to claim 2, wherein
the bent portion is bent so as to cause the first terminal and the second terminal to be spaced from each other in an arrangement direction of the first terminal and the second terminal.

4. The electronic component according to claim 2, wherein
a plurality of the first terminals and a plurality of the second terminals are respectively disposed in parallel rows, and
bent portions of adjacent first terminals are bent so as to cause the adjacent first terminals to be spaced from each other in a row-wise direction of the first terminals, and bent portions of adjacent second terminals are bent so as to cause the adjacent second terminals to be spaced from each other in a row-wise direction of the second terminals.

5. The electronic component according to claim 2, wherein
a plurality of the first terminals and a plurality of the second terminals are respectively disposed in parallel rows, and
the bent portions of the first terminals and the bent portions of the second terminals are respectively bent so as to cause the first terminals and the second terminals to be spaced from each other in the arrangement direction of the first terminals and the second terminals and also to be spaced from each other in corresponding row-wise directions of the first terminals and the second terminals.

6. The electronic component according to claim 2, wherein
the retention wall include an embedment portion in which each bent portion is buried.

7. An electronic component comprising:
a first terminal to be inserted into a first connection chamber formed in a movable housing of a movable connector;
a second terminal to be inserted into a second connection chamber formed in the movable housing; and
a retention housing having a retention wall for retaining the first terminal and the second terminal, wherein
the first terminal and the second terminal have respective connector-connection portions that extend from one side of the retention wall toward the movable connector and also have respective external connection portions that extend from the other side of the retention wall, and
the first terminal and the second terminal are configured such that a clearance between the connector-connection portions being adjacent to each other is larger than a clearance between the external connection portions being adjacent to each other,
wherein
at least one of the first terminal and the second terminal has a bent portion that causes the clearance between the connector-connection portions to be larger than the clearance between the external connection portions,
a plurality of the first terminals and a plurality of the second terminals are respectively disposed in parallel rows, and
bent portions of adjacent first terminals are bent so as to cause the adjacent first terminals to be spaced from each other in a row-wise direction of the first terminals, and bent portions of adjacent second terminals are bent so as to cause the adjacent second terminals to be spaced from each other in a row-wise direction of the second terminals, and
the first terminal and the second terminal on each row also being bent so that row spacing on one side of the retention wall is different than the row spacing on an other side of the retention wall.

8. An electronic component comprising:
a first terminal to be inserted into a first connection chamber formed in a movable housing of a movable connector;
a second terminal to be inserted into a second connection chamber formed in the movable housing; and
a retention housing having a retention wall for retaining the first terminal and the second terminal, wherein
the first terminal and the second terminal have respective connector-connection portions that extend from one side of the retention wall toward the movable connector and also have respective external connection portions that extend from the other side of the retention wall, and
the first terminal and the second terminal are configured such that a clearance between the connector-connection portions being adjacent to each other is larger than a clearance between the external connection portions being adjacent to each other
wherein
at least one of the first terminal and the second terminal has a bent portion that causes the clearance between the connector-connection portions to be larger than the clearance between the external connection portions,
a plurality of the first terminals and a plurality of the second terminals are respectively disposed in parallel rows, and
the bent portions of the first terminals and the bent portions of the second terminals are respectively bent so as to cause the first terminals and the second terminals to be spaced from each other in the arrangement direction of the first terminals and the second terminals and also to be spaced from each other in corresponding row-wise directions of the first terminals and the second terminals,
the first terminal and the second terminal on each row also being bent so that row spacing on one side of the retention wall is different than the row spacing on an other side of the retention wall.

* * * * *